June 19, 1934.  W. L. DAVIS  1,963,356
CAR
Filed Aug. 8, 1930   4 Sheets-Sheet 1

Inventor:
William L. Davis
John C. Carpenter
Atty.

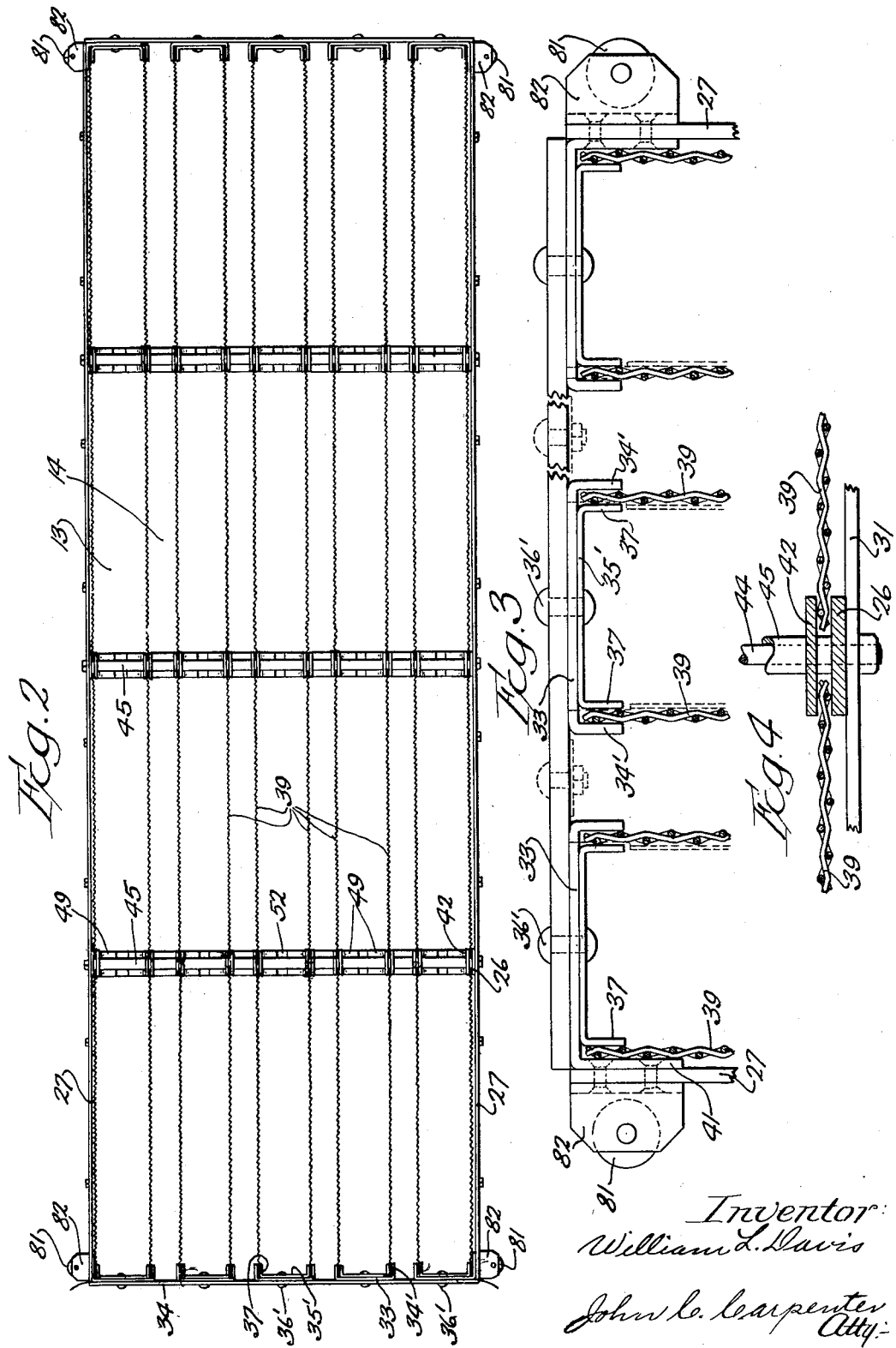

June 19, 1934.　　　W. L. DAVIS　　　1,963,356
CAR
Filed Aug. 8, 1930　　　4 Sheets-Sheet 3
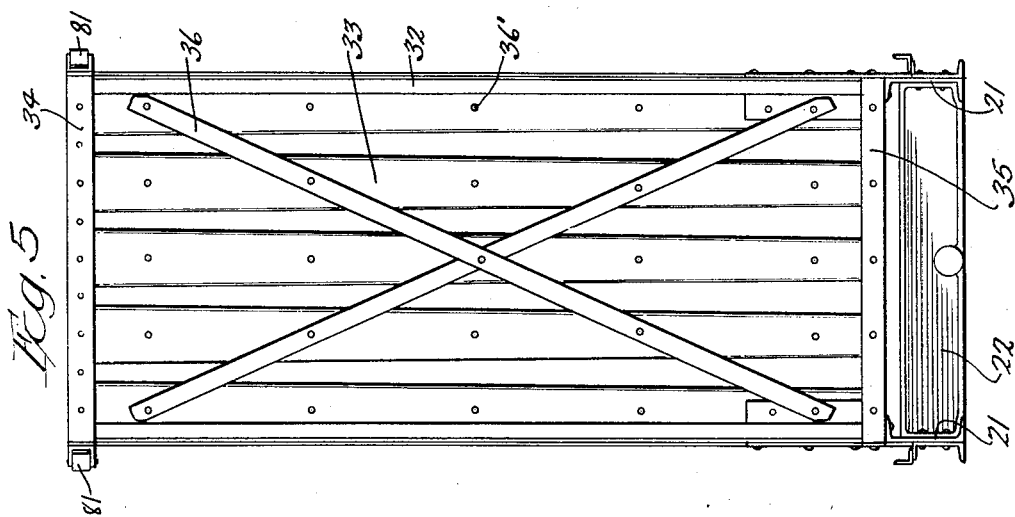
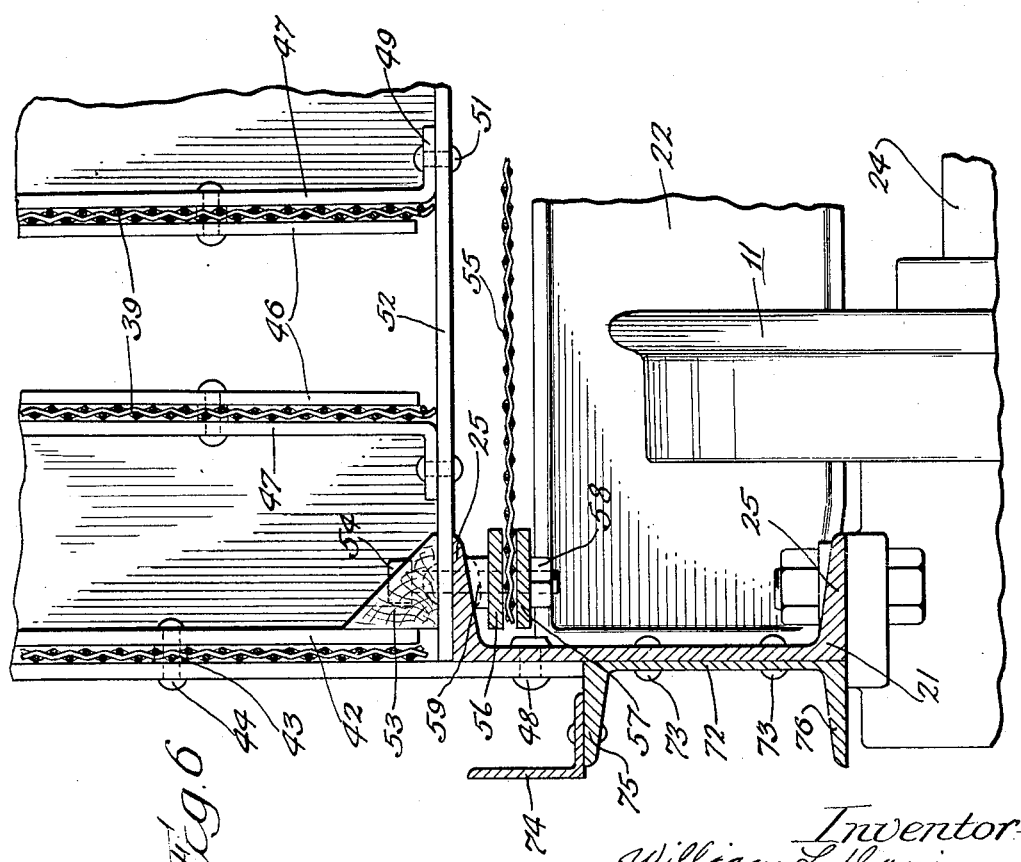
Inventor:
William L. Davis
John C. Carpenter
Atty.

June 19, 1934.  W. L. DAVIS  1,963,356
CAR
Filed Aug. 8, 1930  4 Sheets-Sheet 4
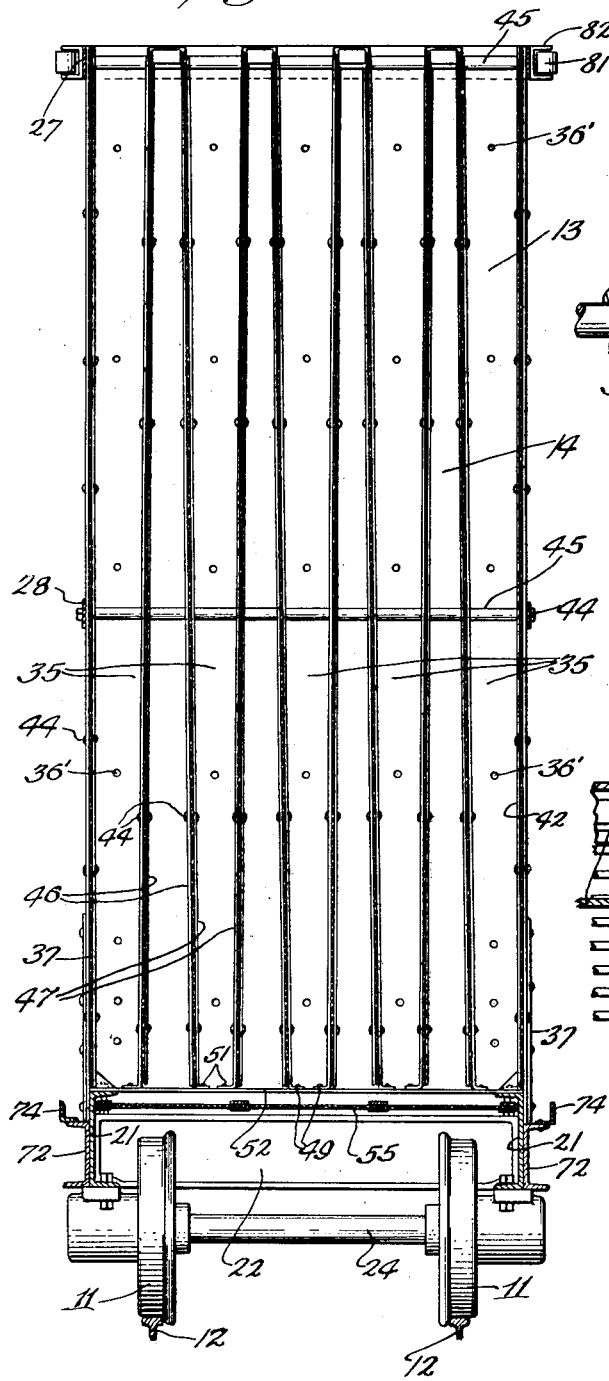
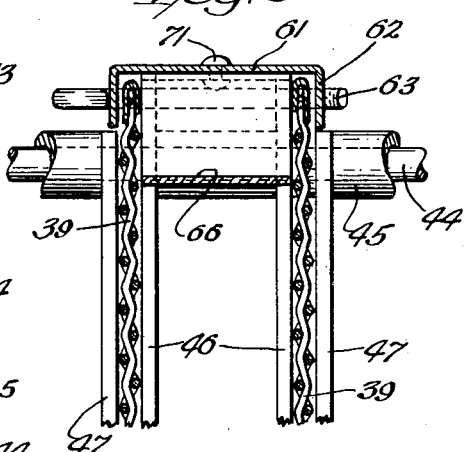
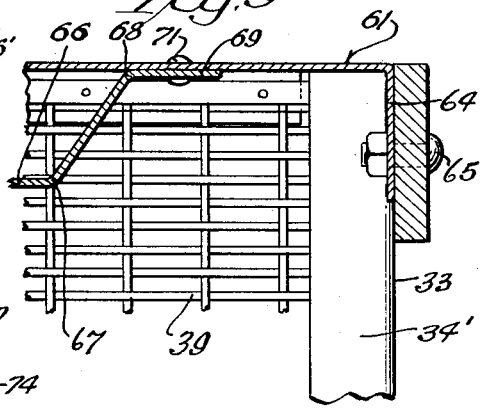
Inventor
William L. Davis
John C. Carpenter
Atty.

UNITED STATES PATENT OFFICE 1,963,356

CAR

William L. Davis, Decatur, Ill., assignor to A. E. Staley Manufacturing Company, Decatur, Ill., a corporation of Delaware Application August 8, 1930, Serial No. 474,010

1 Claim. (Cl. 34—17)

This invention relates to apparatus for use in the drying of granular or pulverulent material, and while it will hereinafter be described as embodied in a car for use in the drying of starch, it will be readily understood that the invention as thus embodied, and as it may be otherwise embodied, has wider and more general application.

A principal object of the invention is the provision of an improved container for starch or other material to be dried, which may conveniently receive the material from any suitable loading mechanism, disposing it in position for economic drying.

Many materials, as starch and the like, require drying in kilns or heated chambers, this being not infrequently accomplished by passing the starch or other material through an elongated passage in which a current of drying medium, such as heated air, is passed in and through said material as the material is conveyed through the passage.

Prior to my invention it has been known to load the starch into long, high, but narrow cells of a car or truck, and to then slowly move the truck through an elongated heating tunnel or passage through which heated air is forced in the direction of movement opposite to that of the truck or car. The starch is placed in the cells in a moist or wet condition, and to a degree at least the contained water settles or tends to settle toward the bottom portions of the cells. The sides of the cells are formed of screens, and the drying is accomplished by the extraction of moisture from the two sides of each cell outwardly. The moisture extraction in drying is substantially uniform per unit of area from the bottom of each cell to its top, and it will therefore be apparent that unless special provision be made, the contained charge will be dried to a greater degree at the tops of the cells than at the bottoms.

My invention has for one important object, the construction and arrangement of the cells to accomplish substantially uniform drying throughout the entire charge in each cell.

Another important object of the invention is the provision of a car for drying starch and other materials, which may be readily moved to and through the drying chambers, and which may thereafter be readily inverted for unloading and through engagement with parts provided on its chassis for holding the car in inverted dumping position. This arrangement permits of the dumping of the car without supporting forces transmitted through the cells of the car body, and the car body is left free for vibration to shake out adhering portions and particles of the charge.

Another important object of the invention is the provision of a car of the general character described, the body parts of which may be of relatively light material, and so constructed and arranged as to be well reinforced and durable in service.

Another important object of the invention is the provision of a construction of the character described, wherein adequate reinforcement is provided at the tops of the cell to prevent bulging.

Another important object of the invention is the provision of a car for drying starch and other material, and having external screen, or foraminous sides, the parts of the car being so constructed and arranged as to catch and retain for final dumping, material sifting through said screens, or foraminous sides, as an incident to the loading and transporting movements of the car and the drying of the charge.

Numerous other objects and advantages of the invention will be apparent as it is better understood from the following description, which, taken in connection with the accompanying drawings, discloses a preferred embodiment thereof.

Referring to drawings,

Fig. 2 is a top plan view of the same.

Fig. 3 is an enlarged partial top plan view of the construction at an end of the car.

Fig. 4 is a partial section taken substantially on the line 4—4 of Figure 1.

Fig. 5 is an end view of the car.

Fig. 6 is an enlarged, fragmentary, vertical section showing certain details of construction.

Fig. 7 is a transverse, sectional view through the car; and

Figs. 8 and 9 are enlarged, detailed sections taken through the top portion of the car and showing the cap and spreader constructions.

Figure 1:
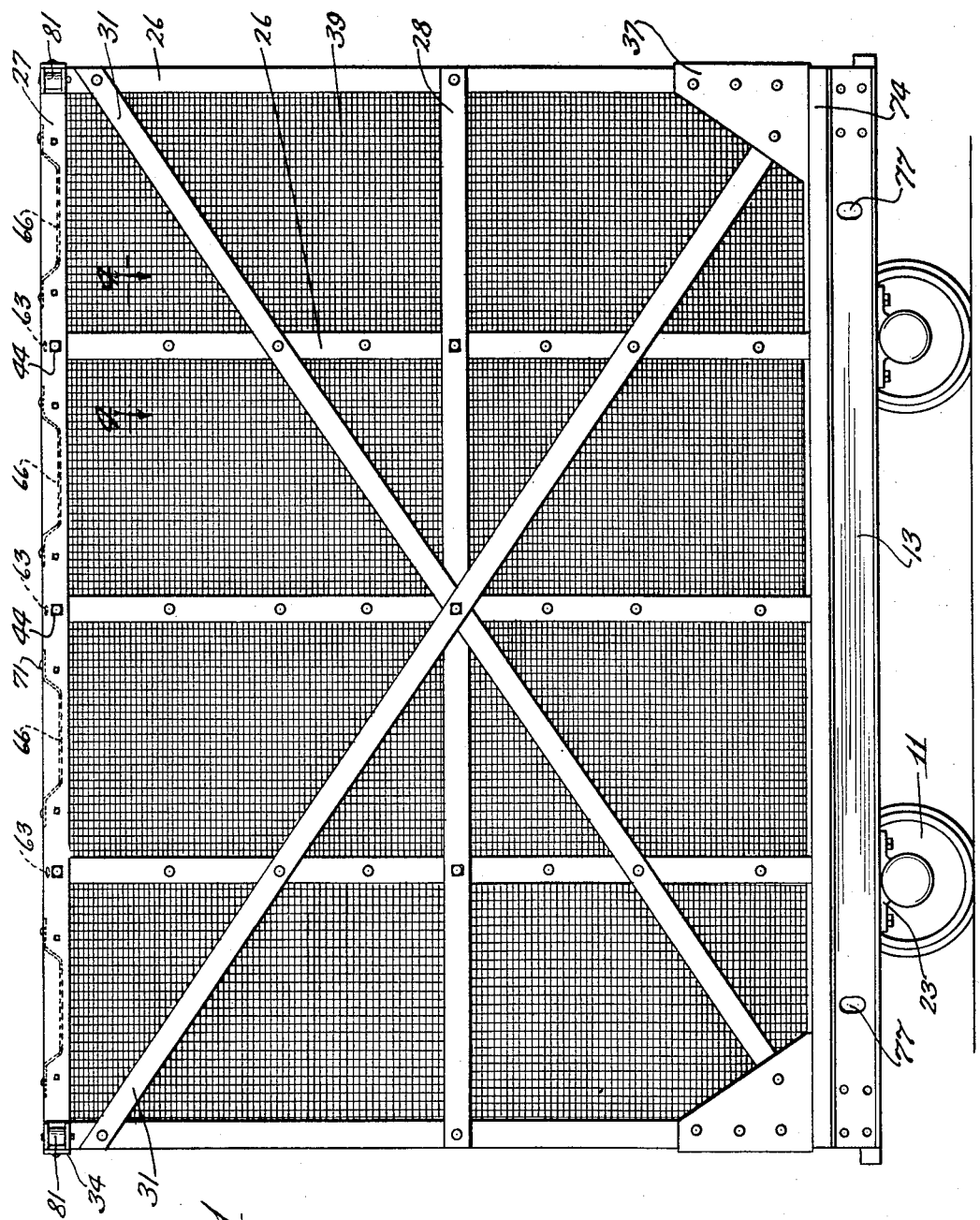
Figure 1 is a side elevation of a starch car embodying my present invention.

For the purpose of illustrating my invention I have shown on the drawings, a car for drying starch in which it is embodied. This car comprises a chassis preferably built up of structural metal, and provided with four flanged wheels 11, adapted to ride upon and be guided by suitable tracks 12, and a body composed of alternately arranged charge containing cells 13 and air circulating and charge containing cells 14 is mounted upon the chassis. The cells 13 are long and high, and relatively narrow or thin horizontally, transversely of the truck. Thus constructed and alternating with the air cells 14, which are likewise of long, high and narrow dimensions, the starch or other material is arranged in relatively thin partitions or bodies of large side superficial areas. The charge containing cells 13, and the air containing end circulating cells 14, are provided and defined by foraminous or screened partitions of fine enough mesh to confine the material and permit the drying out and passage of the contained moisture or water.

In the present instance, five starch or charge containing cells are provided, and four intermediate air or drying cells.

As has been explained in the introduction to this specification, the contained water or moisture has a tendency to gravitate toward the lower portions of the cells after they are loaded, and during their transportation to and partially through the drying furnace or kilns. The drying occurs with substantial uniformity throughout the entire exposed vertical faces of the cells 13, and since there is a greater amount of moisture to be extracted from the lower portions of the cells than from the upper, I have tapered the cells upwardly and outwardly from their bottoms, this being accomplished by inclining the screen partitions, as may be observed in Fig. 7; the amount of inclination being determined by the extent of gravitation of the moisture. The heated drying air passing through the tunnels provides maximum drying effect at and near the tops of the tunnels, i. e. where the cells constructed in accordance with my present invention dispose the greatest thickness of starch body.

The chassis in the instant embodiment of the invention consists of relatively heavy side channels 21, which are connected at their ends by rigid cross members 22. Suitable bearings 23 are arranged to extend down beneath the side channels 21 to receive the wheel axles 24. The channels 21 are arranged with their parallel flanges 25 extending inwardly of the car, the upper of these flanges being preferably disposed above the end cross members 22. The body of the car is secured to and supported by the upper horizontal flanges 25 of these side channels.

The car body is or may be built up of structural iron members, providing a skeleton framework, which consists at the sides of spaced uprights 26, top and intermediate horizontal members 27 and 28, and diagonal bracing members 31, all suitably bolted or riveted together, as may be observed in Fig. 1. The ends of the body frame consist or may consist of vertical edge members 32, intermediate cell end members 33, top and bottom and frame members 34 and 35, and diagonal bracing members 36. Suitable plates 37 may be provided where desired to both connect the body frame members and to reinforce and stiffen the construction.

As has been said, the cells are formed of screen or foraminous partitions, and in the instant embodiment of the invention, the frame parts are constructed and arranged to suitably connect and hold the partition members in place and to permit their individual removal and replacement, as occasion may render desirable.

The car is relatively long, and each partition is preferably made up of a number of screen members, each extending throughout the height of the cell body of the car.

A channel construction is provided for the reception of the two edges of each screen member, as will now be described. Each cell end member 33 is of channel form, having its flanges 34 spaced apart slightly more than the full cell thickness. A second channel member 35 is arranged within each channel member 33, and is riveted to it and connected at 36'. The flanges 37 of the inner channel 35 are spaced from the flanges 34 of the companion channel 33 a distance to receive and retain the edges 38 of the adjacent screen sections 39.

At the sides of the car the channel members 33 are preferably provided with a somewhat longer flange 41, adapted to be secured to the adjacent side top frame members 27. A vertically arranged retaining strip or plate 42 is arranged just inwardly, but spaced from each of the intermediate upright side frame members 26, and is held in this spaced relation by collars 43 carried upon rivets 44, which pass through the associated side frame members 26 and retaining strips 42. Each said side frame member 26 and its retaining strip provide channels for receiving the adjacent edges of the screens of the partitions. If desired, cross tie rods 44 may extend at desired intervals across the entire car body, being embraced by spacer sleeves 45 to hold the parts in their original predetermined position, as will be readily understood.

Intermediate the sides of the car, the partition screen members are held in place by vertical frame members 46 and 47, similarly constructed and arranged in spaced relation to receive and hold the screen sections.

The side frame members 26 extend down over the outer faces of the channels 24 and are riveted to them at 48. A member of each pair of frame uprights at the intermediate partitions, i. e. the member indicated by reference character 47, is provided at its lower end with an angle bend 49, which is riveted at 51 to a cross support 52 carried upon the upper faces of the top horizontal flanges 25 of the side channels 21. Filler blocks 53 are or may be provided to reinforce the construction, and bolts 54 extend through these filler blocks and through the top flanges 25.

A sheet 55, preferably of screen material, is arranged beneath the cells and this screen is held at its edges between clamping bars 56 and 57, in turn secured in place upon the bolts 54 by nuts 58, spacing blocks or washers 59 being provided preferably between the top plate or bar 56 and the presented face of the top channel flange 25.

Thus constructed and arranged it will be manifest that any one or all of the screen sections may be readily and individually removed, the vertical screen sections being removable by lifting them out of their channels, and the bottom or floor screen 55 by removing the retaining plates or bars 57.

The bulging of the screen partitions is prevented at the bottoms by the flanges 49 and the rivets connecting them with the cross bars 51. It is prevented intermediate the heights of the partitions by the cross tie rods 44, and is partially prevented at the tops by the tie rods 44 there located. The bulging of the screen is further prevented at the tops by spacer members which are carried by cap plates 61, which are provided to close the tops of the cells 14 and prevent the starch or other material being deposited in these cells in loading the screens. Each of the cap plates 61 preferably consists of a galvanized metal sheet or strip having its lateral edges bent down to form flanges 62, arranged beyond or upon the charge containing sides of the screen members, as may be observed in Fig. 8. The vertical frame members 46 are extended up above the lower edges of the flanges 62 and cotter pins 63 are arranged through the frame members 46 and the flanges 62 to hold the caps against spreading intermediate the ends. Each cap plate 61 is provided with a down-turned flange 64 at each end, which is bolted at 65 to the top end frame member 34. Spreaders or spacing members 66 are arranged at intervals along each cap member 61, and extend down between the presented screen surfaces to aid in holding the upper edges of the screens against bulging. Each of the spreaders or spacing members 66 consists of a metal strip of appropriate width, bent at 67 and 68 to provide an offset central portion, and end flanges 69 which are riveted at 71 to a cap member.

Material sifting through the intermediate screen partitions and from the starch or charge containing cell 13 into the intermediate air cells 14 will be received upon and retained by the bottom screen 55. Particles of starch or other material sifting through the outside screen sections will be received and retained by a receiving channel to be now described. A channel iron 72 is riveted at 73 alongside each main channel frame member 21, and an angle iron 74 is arranged upon the upper horizontal flange 75 of the channels 72. The angle iron 74 provides a channel with adjacent parts into which downwardly sifting material will be received.

After drying is accomplished it is intended that the car with its contents will be run upon a tipple and inverted for discharge. As the car in its dumping approaches and passes 90° the material sifting on to the screen 55 and into the side channel constructions will be dumped or poured out into the receiving hopper or bin.

The car embodying the present invention, and shown on the drawings for the purpose of illustration, is provided with the laterally extending, horizontal channel flanges 76, which may be engaged as the car is turned to support it in inverted discharging position. This construction permits the dumping of the car without engagement of the body by retaining devices, so that at no step in the operation is it necessary that the top of the car be of sufficiently sturdy construction to support the car and the load during discharge.

My invention contemplates also the provision of special features of car construction for holding the car upon the tipple during the turning movement, and prior to its complete inversion. Holes 77 are arranged in the chassis frame 13, as may be seen in Fig. 1, in which holes suitable retaining devices may be engaged to hold the car from rolling off the tipple, and until it is supported from its channel flanges 76.

If desired, rollers 81 mounted in brackets 82 at the top corners of the body may be provided to engage the side walls of the kiln if the kiln be narrow and the body sway in its movement through it.

It will be apparent that in constructing the car so that it may be sustained in the inverted position from its chassis, the body is left free for unrestrained vibration by suitable vibrating mechanism. The tapering shape of the cells facilitates discharge of the contents when the car is in the inverted position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A dump car for drying starch and the like, comprising a base frame having means thereon for cooperating with a tipple mechanism operable to invert the car into dumping position, and a plurality of relatively narrow starch-drying compartments mounted on said frame in spaced relation to each other and extending a substantial distance above said base frame, said compartments being formed of a foraminous material and having a downward taper sufficient to permit the starch in the entire compartment to dry at substantially the same rate and to facilitate dumping of the dry starch when the car is in inverted position.

WILLIAM L. DAVIS.